A. C. CAMPBELL.
SNAP HOOK.
APPLICATION FILED APR. 28, 1915.
1,157,757.
Patented Oct. 26, 1915.
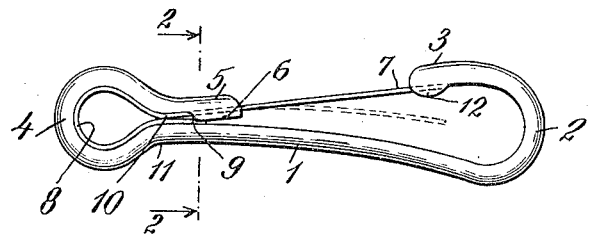
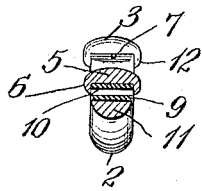
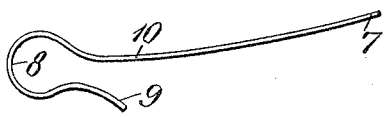
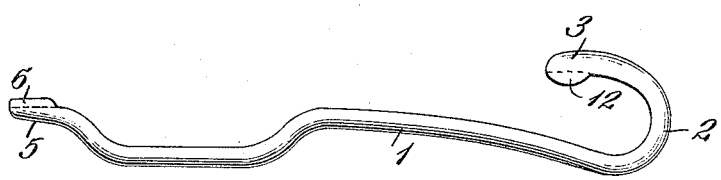
WITNESSES:
Charles Eberhart
Jessie B. Kay.
INVENTOR
Andrew C. Campbell
BY
Harry L. Duncan ATTORNEY
COLUMBIA PLANOGRAPH CO., WASHINGTON, D. C.

UNITED STATES PATENT OFFICE.

ANDREW C. CAMPBELL, OF WATERBURY, CONNECTICUT, ASSIGNOR TO AMERICAN CHAIN COMPANY, INCORPORATED, OF BRIDGEPORT, CONNECTICUT, A CORPORATION OF NEW YORK.

SNAP-HOOK.

1,157,757.    Specification of Letters Patent.    Patented Oct. 26, 1915.

Application filed April 28, 1915. Serial No. 24,400.

*To all whom it may concern:*

Be it known that I, ANDREW C. CAMPBELL, a citizen of the United States, residing at Waterbury, New Haven county, Connecticut, have made a certain new and useful Invention Relating to Snap-Hooks, of which the following is a specification, taken in connection with the accompanying drawing, which forms part of the same.

This invention relates especially to snap-hooks comprising a hook member preferably formed of wrought metal, such as half round or other steel wire stock, for instance, bent up to form a hook and formed with an integral shank and eye, and a coöperating spring member having its snap end normally engaging the hook end and formed with an integral spring loop extending within and preferably closely held by the eye of the hook, there being suitable securing means to hold these parts in proper alinement, suitable alining or securing flanges being preferably formed on the eye or extended securing tip of the hook member so as to engage the adjacent parts of the spring which may with advantage be formed with an anchor end in engagement with the shank of the hook.

In the accompanying drawing showing in a somewhat diagrammatic way illustrative embodiments of this invention, Figure 1 shows in elevation one form of the spring hook. Fig. 2 is a transverse sectional view taken substantially along the line 2—2 of Fig. 1. Fig. 3 is a detail view showing the spring; and Fig. 4 shows the hook member before assembly.

This snap-hook may be formed of stock of any suitable shape and material and as indicated in the drawing the hook member may be formed of half round wire stock, such as ordinary low carbon steel used for chain and so forth, although, of course, other grades of steel, iron or brass may be used, if desired. This stock may be bent to form the shank 1 and hook 2 integral therewith, the hook end 3 having, if desired, suitable lateral alining flanges 12 forged or formed therefrom and pressed down at each edge as shown in Fig. 2 so as to loosely embrace the snap end and hold it in lateral alinement. The eye 4 may be conveniently formed integral with the shank by bending the stock into the desired form and any suitable securing means may be provided in connection with this part of the hook member to hold the spring member in proper relation thereto, such for example as by extending this end of the hook member to form a suitable securing tip, such as 5, which preferably has alining or securing flanges 6 bent down at either side of the same to hold the spring in substantial alinement without weakening the spring or hook eye. The spring member which may be of tempered spring steel or any other suitable material may with advantage be mounted within the hook member by having a bent portion or spring loop 8 secured within the eye 4 and the spring may also, if desired, have a suitable anchor end 9 extending some distance along the shank 1 so as to be within the securing flanges 6, if desired. In this way when the securing tip is forced down so as to bring the spring shank 10 nearly into engagement with the anchor end or portion 9, the snap end 7 of the spring is given a very free and desirable yielding action so that when the shank end is bent inward away from the hook end 3 the spring can yield as far back as the shank 10 or even beyond in some cases. It is sometimes desirable, however, to force the spring shank and anchor end into practically close contact adjacent the spring loop and this may be readily done by forcing together the corresponding parts of the hook member adjacent the eye 4 so that these parts form the neck 12 and closely engage the spring member within. The spring loop is thus securely held by the eye which engages it closely enough to prevent undesirable movement of the parts and the spring loop also forms a hardened reinforcing lining for the eye to minimize wear.

In making up and assembling the device the spring may in any suitable way be given the shape indicated in Fig. 3 and tempered, and the hook member preferably after having the alining flanges 6, 12 formed thereon and having the hook 2 bent up if desired may have the spring inserted therein and the eye bent up in a suitable forming press or otherwise so as to inclose and hold the spring loop and form the completed hook shown in Fig. 1.

This invention has been described in connection with a number of illustrative materials, parts, forms, arrangements and devices, to the details of which the invention is not of course to be limited, since

What is claimed as new and what is desired to be secured by Letters Patent is set forth in the appended claims.

1. The snap-hook comprising a hook member of half round wrought metal stock bent up to form a hook provided with inwardly projecting alining flanges on the hook end and formed with an integral shank and eye and with a securing tip provided with inwardly projecting securing flanges adjacent said shank, and a coöperating spring member having its snap end normally engaging said hook end between said alining flanges and having its shank normally held in alinement by said securing flanges and having an integral spring loop extending within and closely held by said eye and having an anchor end in engagement with the shank of the hook and with the spring shank adjacent said loop.

2. The snap-hook comprising a hook member formed with a hook and with an integral shank and eye and with a securing tip provided with projecting securing means, and a coöperating spring member having its snap end normally engaging said hook end and having its shank normally held in alinement by said securing means and having an integral spring loop extending within said eye and having an anchor end in engagement with the shank of the hook.

3. The snap-hook comprising a hook member of wrought metal stock bent up to form a hook and formed with a shank and eye, and a coöperating spring member having its snap end normally engaging said hook and having an integral spring loop extending within and closely held by said eye and having an anchor end in engagement with the hook member, there being securing means on said hook member coöperating with said spring member adjacent said spring loop to hold said spring member in substantial alinement with said hook.

4. The snap-hook comprising a hook member having a hook, shank and eye, and a coöperating spring member having its snap end normally engaging said hook and having an integral spring loop extending within said eye and having an anchor end in engagement with the hook member, there being alining means coöperating with said hook member and said spring member adjacent said spring loop to hold said spring member in substantial alinement with said hook.

5. The snap-hook comprising a hook member having a hook, shank and eye, and a coöperating spring member having its snap end normally engaging said hook and having a spring loop extending within said eye and having an anchor end in engagement with the hook member.

ANDREW C. CAMPBELL.

Witnesses:
BENJAMIN WALLACE,
JOHN P. RAMSEY.

Copies of this patent may be obtained for five cents each, by addressing the "Commissioner of Patents, Washington, D. C."